United States Patent [19]

Breton

[11] Patent Number: 4,504,882

[45] Date of Patent: Mar. 12, 1985

[54] REGULATED-CURRENT SOURCE AND CONTROLLED-VOLTAGE GENERATOR

[76] Inventor: Jacques Breton, 9, avenue de Gradignan, Pessac, France

[21] Appl. No.: 480,449

[22] Filed: Mar. 30, 1983

[30] Foreign Application Priority Data

Apr. 7, 1982 [FR] France ................................ 82 06310

[51] Int. Cl.[3] ................................................ H02H 3/08

[52] U.S. Cl. ........................................ 361/93; 361/18; 361/101; 323/265; 323/270; 323/276; 323/277; 128/908; 128/419 PS

[58] Field of Search ........................ 361/18, 77, 93, 98, 361/100, 58, 101; 323/265, 270, 276, 277, 268; 128/419 PS, 419 R, 908

[56] References Cited

U.S. PATENT DOCUMENTS 3,376,478 4/1968 Sheng et al. ...................... 361/18 X
4,119,906 10/1978 Gonda ............................ 361/18 X

FOREIGN PATENT DOCUMENTS 2062373 5/1981 United Kingdom .

*Primary Examiner*—Patrick R. Salce
*Attorney, Agent, or Firm*—Seidel, Gonda & Goldhammer

[57] ABSTRACT

This invention concerns a regulated-current source and a controlled-voltage generator comprising an injector (Ir) kept at a constant potential ($U_1$) by a regulation loop ($D_1$, $C_1$) which by means of a unit (C.G.) controls the intensity (i) of the current flowing in a load (R).

9 Claims, 6 Drawing Figures

REGULATED-CURRENT SOURCE AND CONTROLLED-VOLTAGE GENERATOR

This invention relates to electronic equipment of the regulated-current source and servo voltage generator type whereby the following can be obtained independently or simultaneously:

(a) A current the value of which is strictly constant or which varies according to an arbitrarily selected law in any constant or variable load.

(b) A voltage at the terminals of said load strictly proportional to the instantaneous value of the load (controlled subject to said load).

(c) Strict independence between the current intensity control circuit and the controlled-voltage utilization circuit.

Known systems of this kind are based essentially on keeping a constant voltage, by means of a suitable control loop, between the terminals of a pure resistance of arbitrary value carrying the current to be regulated. These systems have a number of fundamental defects due to their construction, and these defects limit performance and the scope and safety in use:

(a) The voltage between the terminals of the current regulating loop varies with the intensity of the current flowing through the load.

(b) Consequently, the gain of the regulating loop varies also and results in an undesirable variation in the regulation ratio.

(c) This variation results in a feedback (coupling) between the load and the regulating loop.

(d) The phase rotations arising from these three processes limit the pass-band and the rise time (pulse response) of the system, which may be more susceptible to spontaneous oscillation which makes it unusable for certain applications.

(e) They also have the disadvantage of an obstructive limitation of the regulation ratio of the current flowing through a variable load when the current intensities required vary within wide limits and/or exceed some tens of a milliamp.

The system according to the invention enables these disadvantages to be obviated and these defects to be overcome. It comprises a first regulation loop for the current supply, which is fed at a potential difference which is kept constant irrespective of the value of the load and the current intensity flowing through it, within the specified operating limits of the system. This effect is obtained by using a second regulating loop which acts on the instantaneous potential of the inlet (hot spot) of the current supply regulating loop, which is kept at a fixed value.

The system according to the invention therefore ensures a strictly one-way (unidirectional) coupling between a four-pole current injector and the load through which this current flows, and this obviates any feedback from the load to the injector: this property is due to a fixed potential being maintained for the hot spot of the current supply, since the latter, delivering a current varying by $\pm\Delta i$ at a fixed voltage U (hence $\Delta U=0$) is loaded with a dynamic impedance:

$$Z=\Delta U/\Delta i=0.$$

There is therefore a very considerable improvement of the characteristics of the system as regards stability, rise time and pass-band, which in this case depend solely on the parameters of each of the two loops considered independently: these parameters can therefore be so determined as to ensure the required result absolutely.

For the purpose of illustrating the invention, there is shown in the drawings a form which is presently preferred; it being understood, however, that this invention is not limited to the precise arrangements and instrumentalities shown.

Figure 1:
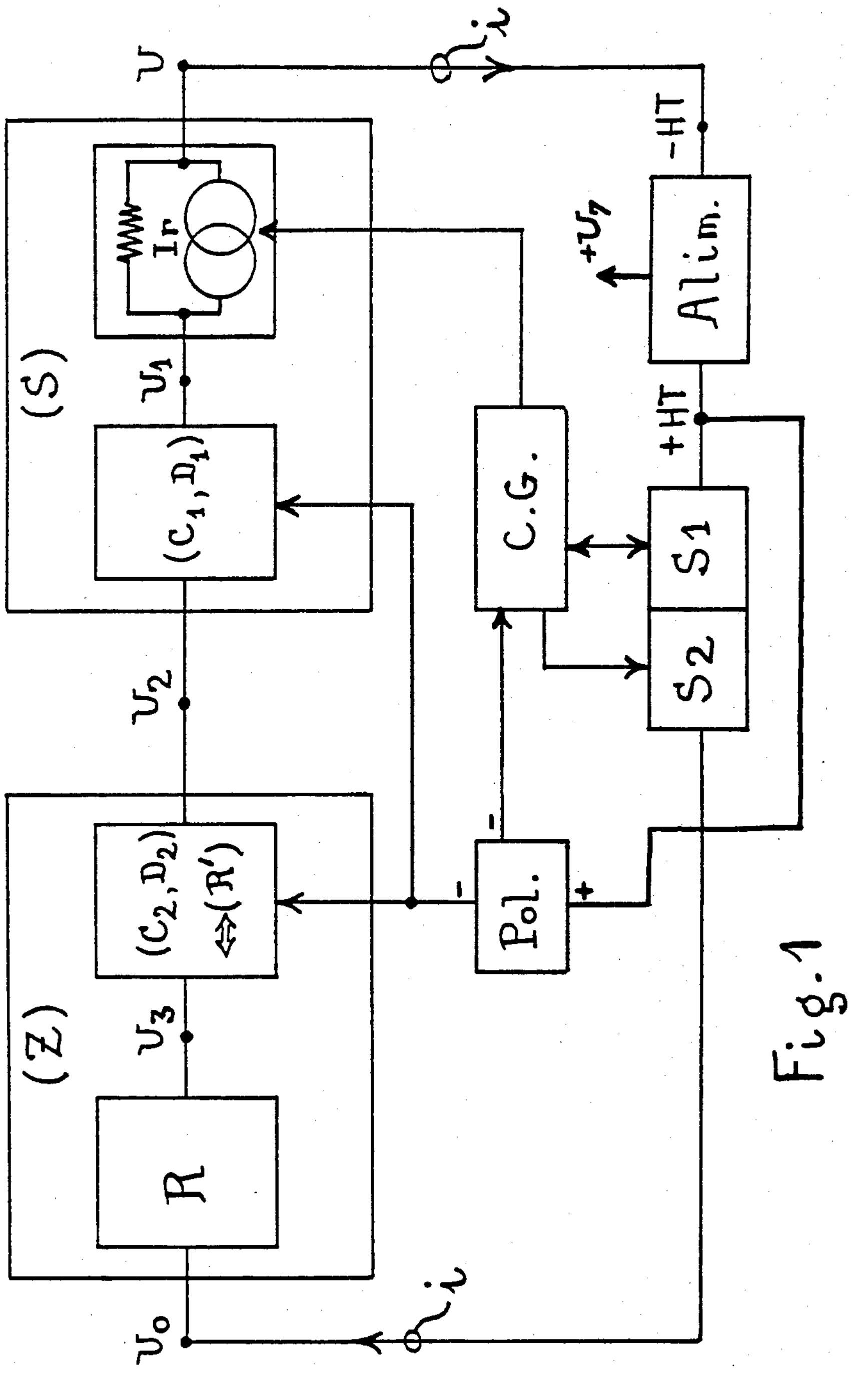
FIG. 1 is a block diagram of the invention illustrating the functions performed by each of the elements of the invention.
Figure 6:
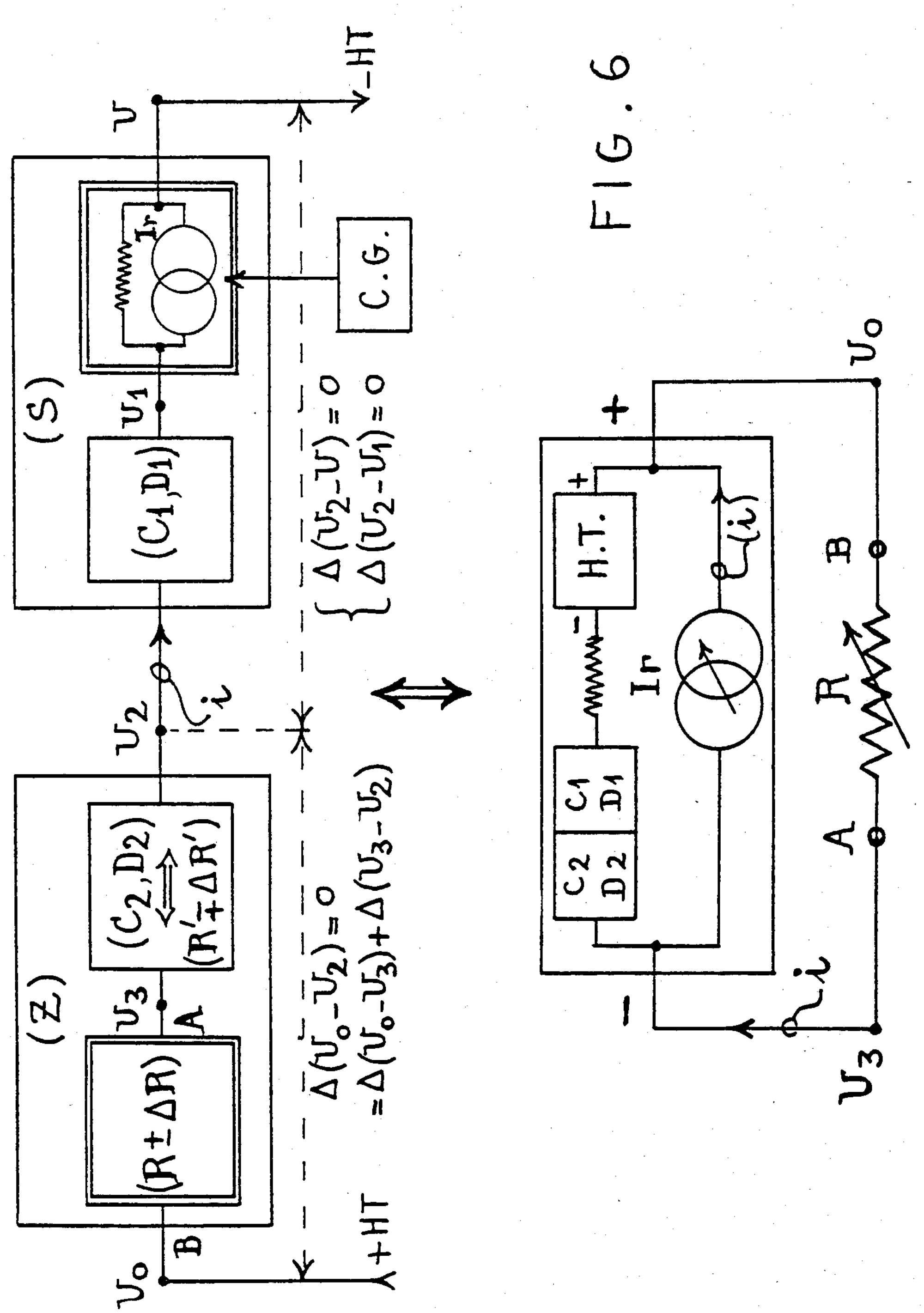
FIG. 6 is an equivalent circuit block diagram of the current and voltage regulating loops of FIG. 2.
Figure 7:
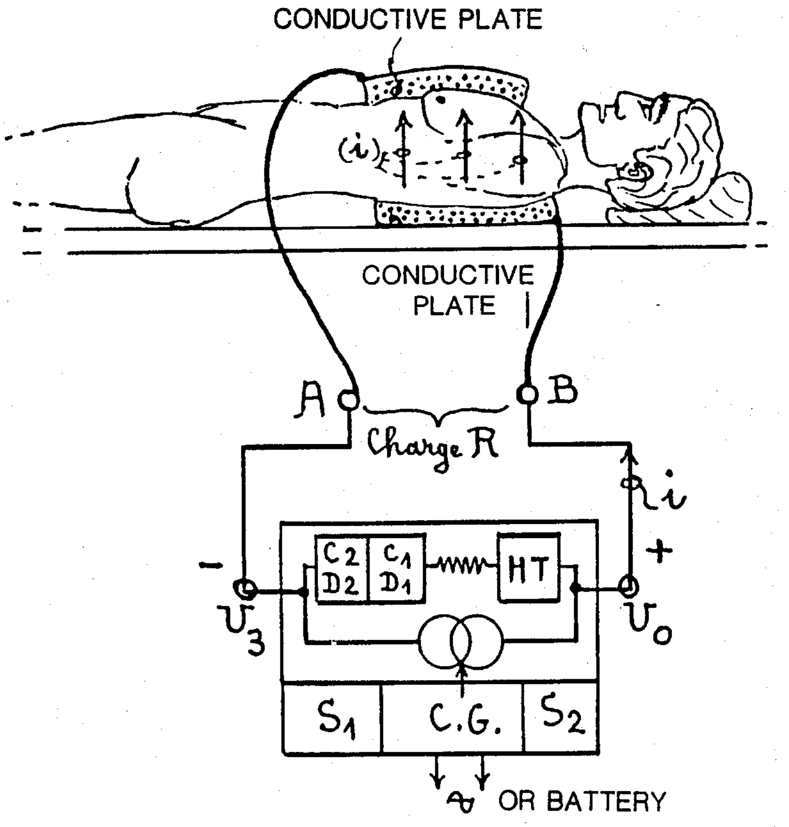
FIG. 7 is a simplified diagram showing one application of the invention in the field of electrotherapy.

Referring to the block schematic diagrams shown in FIG. 1 and FIG. 6, the system according to the invention comprises the following:

(1) A stabilized high voltage d.c. supply (designated "Alim.");

(2) A current regulating loop s comprising a four-pole injector $I_r$, a bias source Pol., a comparison element (discriminator) D1 for comparing voltage U1 with a fixed reference voltage, a correction element (current amplifier) C1 which holds the potential U1 at a fixed value.

(3) A voltage control loop (at the current regulating loop input hot spot), comprising a comparison element (discriminator) D2 for comparing voltage U2 with a fixed reference voltage, and a correction element (current amplifier) C2 holding the potential U2 at a fixed value.

(4) The load R, which may be constant or variable, and through which flows current i, of which the injector Ir controls the instantaneous value;

(5) The general control unit C.G. for the system in a particular application, for example to the biomedical field, and (6) The two units S1 and S2 adapted to monitor the system and actuate the safety systems required in respect of the application to the exemplary biomedical field.

Figure 2:
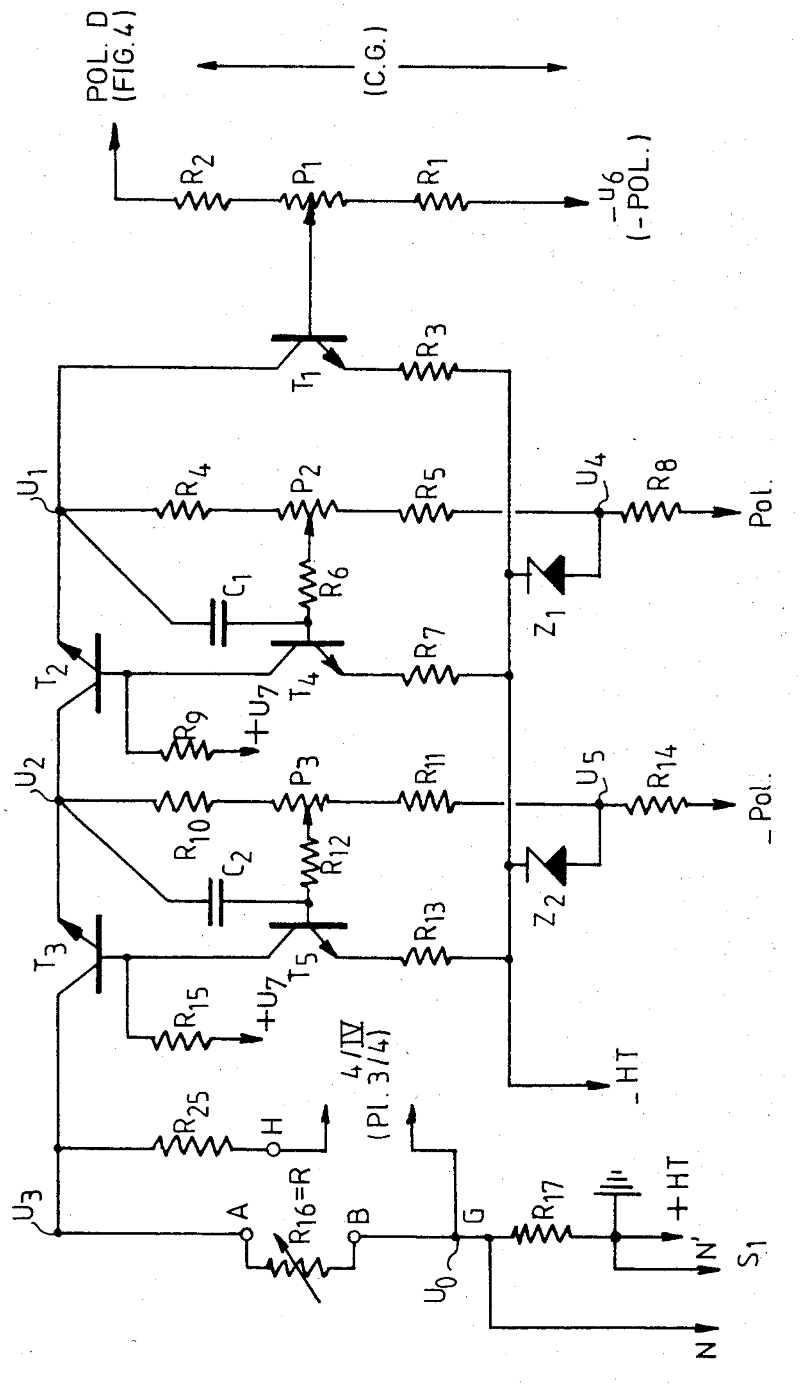
FIG. 2 is schematic diagram of one embodiment of the current and voltage regulating loops of FIG. 1.

FIG. 2 illustrates one embodiment of the system using discrete electronic components. This example in no way limits the invention, which can be embodied with integrated circuits (operational amplifiers etc) or any other electronic means providing the necessary functions and giving the required result.

The injector element Ir comprises an npn type transistor T1 provided with an emitter resistor R3 connected to the −HT, the base being fed via the resistor network R1, P1, R2 disposed between −Pol. and +U7 via the safety unit S2. See also FIGS. 3 and 4. The potentiometer P1 thus varies the base current of T1 and hence the main current i.

The comparison element D1 comprises a resistor bridge R4, P2, R5 connected between the potential point U1, which is required to remain at a fixed value, and the reference potential point U4 obtained from the negative voltage source element −Pol. feeding the Zener diode Z1 via the resistor R8. The mean potential of the base of the npn type transistor T4 is fixed with potentiometer P2 through resistor R6, while capacitor C1 transmits the rapid fluctuations of the potential U1 directly to the base of T4. The emitter of T4 is connected to the −HT supply element via a resistor R7 while the collector of T4 connected to the +U7 via the resistor R9 is also connected to the base of transistor T2, whose current it controls.

The correction element T2 is an npn type transistor, the base of which is connected d to the collector of T4 which thus controls the base current of T2 and therefore keeps the potential U1 of the emitter of transistor T2 at a constant value. The emitter of T2 is connected to the collector of T1 and the collector of T2 is at the fixed potential U2.

The combination of the above elements (which forms the first "current control loop") so operates that the potential U1 remains fixed at a value which depends only on the potentiometer P2, which for this purpose fixes the base current of T4 while the main current i flowing through T1 and T2 depends only on potentiometer P1, which for this purpose fixes the base current of T1.

The comparison element D2 comprises a resistor bridge R10, P3, R11 connected between the potential point U2 required to remain at a fixed value and the reference potential of point U5 produced by the negative voltage source element −Pol. supplying the Zener diode Z2 via the resistor R14. The mean potential of the base of the npn type transistor T5 is fixed by the potentiometer P3 through the resistor R12 while capacitor C2 transmits the fast fluctuations of potential U2 directly to the base of T5. The emitter of T5 is connected to the −HT supply element via a resistor R13 while the collector of T5 connected to +U7 via resistor R9 is also connected to the base of transistor T3, whose current it controls.

The correction element T3 is an npn type transistor, the base of which is connected to the collector of T5, which thus controls the base current of T3 and therefore keeps the emitter potential U2 of said transistor T3 at a constant value. The emitter of T3 is connected to the collector of T2 while the collector of T3 is connected to the input A of the load R16, the potential U3 of which varies successively or simultaneously depending upon the controlled variations of the main current i and the controlled or random variations of the said load R16 so that the potential difference $(U_0-U_2)$ remains strictly constant or alternatively the sum of the variations $\Delta(U_0-U_3)+\Delta(U_3-U_2)$ remains strictly zero.

The combination of elements D2, C2 forming the second "voltage control loop" operates in such a manner that the potential $U_2$ remains fixed at a value which depends only on the potentiometer P3 which for this purpose fixes the base current of T5, while the main current i again depends only on potentiometer P1. Finally, resistor R17 carrying the main current i delivers a voltage proportional to said current i: this voltage is compared in safety element S1 with a reference voltage and thus drives a device which suppresses the high voltage +HT in the event of accidental excess value of the main current i. (see FIG. 5.)

When the potentiometer P1 makes the potential of the base T1 negative with respect to the potential of the emitter of said T1, the main current i is zero; the potentials U1 and U2, which are arbitrarily fixed, depend only on potentiometers P2 and P3, the positions of which remain fixed; the potentials U3 and U0 are equal while the difference (U3−U2) has the maximum value selected and is then equal to (U0−U2). A resistor R25 provides electrical continuity of the circuit +HT, R17, T3, etc. when the load R16 is not connected between A and B (AB "open"); said resistor is rendered inoperative by combination S2, C.G., as soon as R17 carries the current i controlled by P1.

When potentiometer P1 is actuated to make the base of T1 positive with respect to its emitter, a given constant current i flows through circuit +HT, R17, R16, T3, T2, T1, R3, −HT. Potential U1 remains invariable because any variation is compensated for by the current regulating loop (D1, C1:) In fact, these variations are divided by the loop gain $G1 \simeq U1/\Delta U1$, that can be made as large as required, thus ensuring a constant value for U1 to an infinitely small tolerance. The capacitor C1 transmits the fast variations of U1, of which it thus provides correction (compensation) in a time, the shortness of which depends only on the characteristics of the components used.

Like the load R16 the transistors T2 and T3 then carry the current (i:) Load R16 is then the site of a voltage drop $U_{BA}=(R16).i$ which reduces the potential U3; potential U2 would then tend to follow this reduction but the voltage control loop (D2, C2) corrects this effect and keeps the potential U2 constant: in fact the variation of U2 is divided by the loop gain $G2 \omega U2/\Delta U2$ which can be made as large as required, thus ensuring a constant value for U2 to within an infinitely small tolerance.

Finally, the quadruple effect required is obtained, i.e.:

The application, to a load R16, of a current i of predetermined form and magnitude, periodic or recurrent, or programmed to an arbitrarily selected law, said current i flowing under conditions which prevent any feedback (coupling) between load R16 and the injector T1.

The production in the load R16 of a current i which is strictly independent of the value and nature of said load (a passive or active dipole or quadripole) within the specified operating limits of the system.

The production at the terminals of the load R16 of a voltage, the law of which may represent the law of variation of i if law R16 is constant, the load of which may represent the law of variation of R16 if the current i is constant, the law of which may represent the complex function (R16).(i) if the load and the current vary independently to their own laws.

The production of a current i and/or of a voltage $U_{BA}$ from zero frequency (continuous) up to pulse states (very wide passband) according to the choice of components of suitable characteristics.

The system according to the invention can therefore operate either as a regulated current supply independent of the load through which this current flows, with a response time (correction/compensation) as short as required, or as a servo voltage supply subject to the value of the load and/or to the form and value of the current flowing through said load, again with a response time as short as required.

The system according to the invention can be used in all cases in which operation of all or part of an electronic system required the use of a current the value of which is strictly subject to a predetermined program, whether the current is to remain strictly constant or vary to an arbitrary law.

One of the advantageous applications may be to apply current to a differential amplifier: A strictly constant value of potential U2 and the control of potential U3 subject to the variations of R16 have two results: The common mode differential gain $G_{dc}$ is greatly reduced while the differential mode differential gain $G_{dd}$ reaches a value very close to the theoretical value: these are exactly what are absolutely essential requirements to be satisfied in such a system. In addition to these two basic qualities there is a characteristic which is difficult to obtain with a differential amplifier: The exceptionally high product of the gain and the passband which enables the system to be used up to frequencies of several tens of MHz.

One particularly interesting application is the use of the system according to the patent in electrotherapy. In this application, the load R16 is part of the human body placed between two conductive current supply electrodes and carrying the said current of intensity i controlled by potentiometer P1. See FIG. 2. Patient protection and safety requirements necessitate the use of means specially intended for application of the system according to the invention, such means comprising the general control unit CG and the safety units S1 and S2 shown in FIGS. 3 and 4. Such safety means which, incidentally, are compulsory according to legislation, thus constitute an inseparable part of the system according to the invention when applied to electrotherapy. These safety means must provide patient protection against any accidental failure of the ac mains and its unforeseen restoration; against any involuntarily erroneous operation on the part of the operator responsible for the treatment; against any internal failure affecting the main circuits (high voltage, and bias) and which may result in dangerous excess current; against any accidental failure of a relay or any equivalent electronic device; against any external accident of any kind requiring immediate disconnection of the main current by a fast, reliable and possibly redundant control; and it is also desirable that except in exceptional cases justified by urgency the return of the main current i to zero should be progressive in order to ensure the patient's comfort.

In the example referred to, these special safety means intended for the use of the system according to the invention in its therapeutic application comprise mixed components, i.e. electromechanical components (relays, contactors, etc) and electronic components (Schmitt trigger circuits and so on). Obviously an example of this kind does not limit the invention, which can be embodied with purely electronic components (bistables, diodes, sensitive contactors etc) in the form of discrete components or integrated circuits or any components adapted to produce the required result for this application.

In the illustrative embodiment shown in FIGS. 2, 3, and 4, the various components were given in the following values:

Transistors T1, T2, T4 and T5: 2N 1711 or equivalent;

Transistor T3: BSX 46 or equivalent;

Transistors T6 and T7: 2N 2905 or equivalent;

Zener diodies Z1 and Z2: BZX 46 C6V8 or equivalent;

Potentiometers: *P*1=1 kΩ, ¼ W, linear; P2=10 kΩ, ¼ W linear; P3=15 kΩ, ¼ W linear; P4=P5=270Ω, ½ W linear;

Resistors: all values in ½ W. *R*1=8.2 kΩ; *R*2=2.5 *k*Ω; *R*3=56Ω; *R*4=33 *k*Ω; *R*5=47 *k*Ω; *R*6=220Ω; *R*7=39Ω; *R*8=600Ω; *R*9=3.3 *k*Ω; *R*10=76 kΩ; *R*11=56 kΩ; *R*12=220Ω; *R*13 =39Ω; *R*14=270Ω; *R*15=3.3 kΩ; *R*16="patient", variable between 0.3 and 10 kΩ; *R*17=47Ω; *R*18=6.5 kΩ; *R*19=4.7 kΩ; *R*20=270Ω; *R*21=1.8 kΩ; *R*22=3.9 kΩ; *R*23=820Ω; *R*24=220Ω; *R*25=10 kΩ;

Capacitors: C1=C2=1 μF, Mylar or equivalent, 60 V.S.; *C*3=1 000 μF, 40 V.S.;

Voltages: +HT=+50 v; −HT=−50 v; +HT'=+12 v; −HT'=−12 v; −Pol.=−24 v; −U6=−24 v; +U7=+24 v; U1=+6 v; U2=+10 v; U3=+50 v to +15 v, depending upon R16 and/or i;

Relays: ISKRA, European standard, 12 V winding, type PR 16 L 4 RT, or equivalent.

Contactors (push buttons): SIEMELEC type LTA or equivalent.

The types of components and the values used are given by way of one possible exemplified emodiment: obviously an example of this kind does not limit the invention, which can be embodied by means of integrated circuits, operational amplifiers or any other current or future components satisfying all or some of the functions exercised by each of the assemblies or subassemblies described in the said example, for the purpose of the required result.

Figure 3:
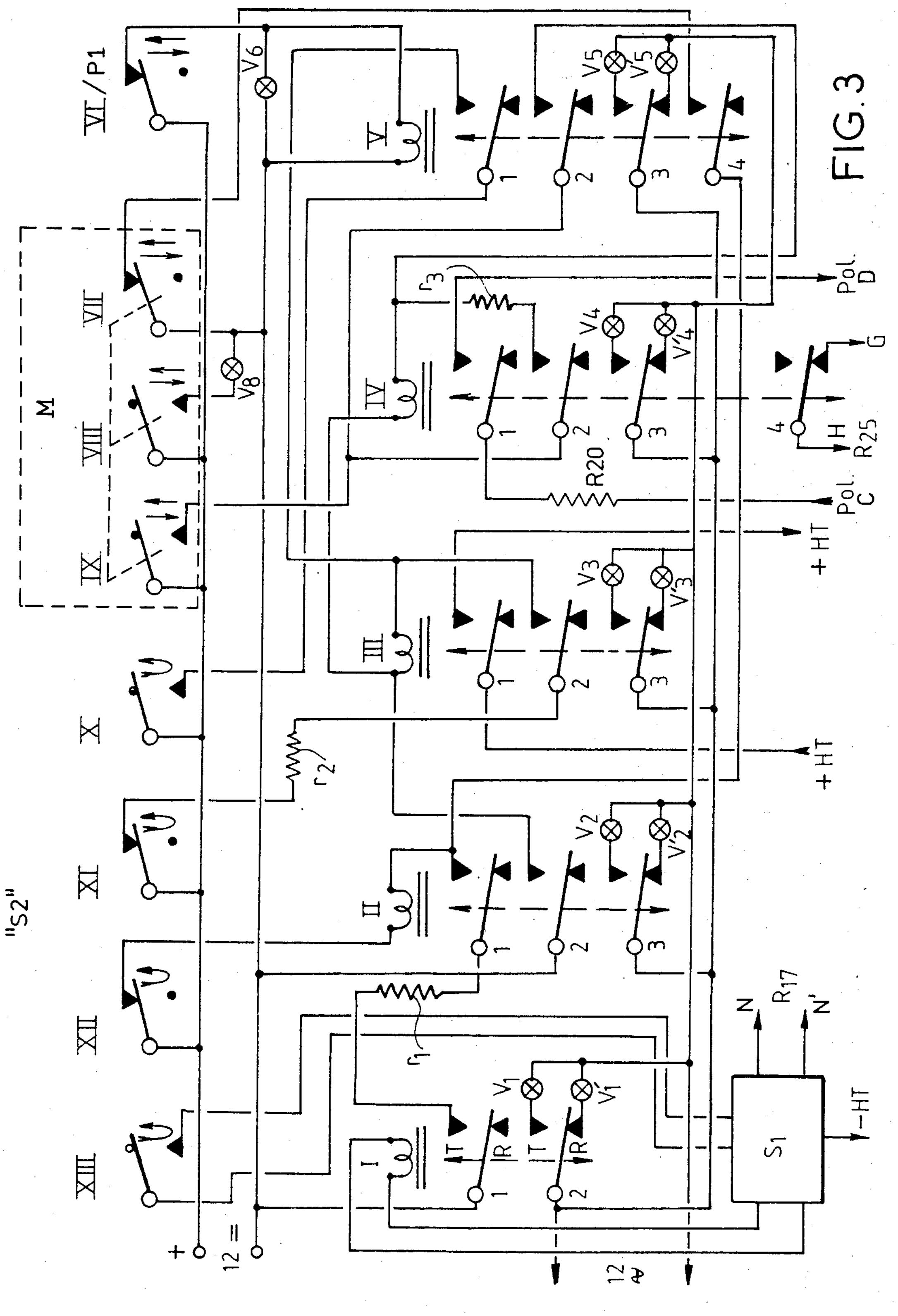
FIG. 3 is a simplified schematic diagram of one safety circuit for use with the invention as applied to the field of electrotherapy.
Figure 4:
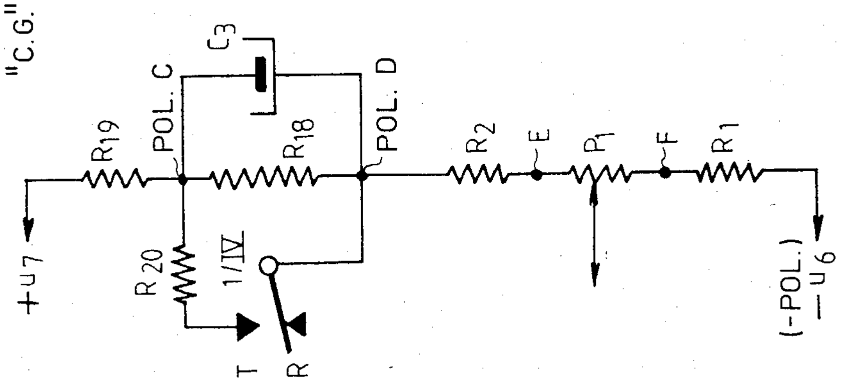
FIG. 4 is a simplified schematic of the control circuit of the invention.

As illustrated in FIGS. 3 and 4, the control and safety units comprise five reversing relays Numbered I to V, shown in the inoperative position (R) (in the absence of any control voltage), the operative position (T) being actuated by one of the eight corresponding contactors numbered VI to XIII, the said contactors also being shown in the inoperative position (R).

A set of different colored pilot lights (V and V') indicates the response and position of the relay or of the corresponding contactor. The contactors XI and XII are of the pressure-actuated temporary break type (manually controlled fast cut-outs). The contactors X and XIII are of the pressure-actuated manually controlled temporary make type. Contactors VI, VIII and IX have two manually controlled fixed positions: "inoperative", or "operative" (R or T); contactor VII has two fixed positions: "inoperative" or "operative". Finally, contactors VII, VIII and IX are controlled simultaneously by a manually set time switch M. Time switch M may be any well-known mechanically operated time switch which provides a time of operation between 0 and 60 minutes. When time switch M is set, the selected time of operation begins to run and the contactors VII, VIII and IX are put in the "operative" position. At the end of the selected time of operation, contactors VII, VIII and IX return to the "inoperative" position.

Figure 5:
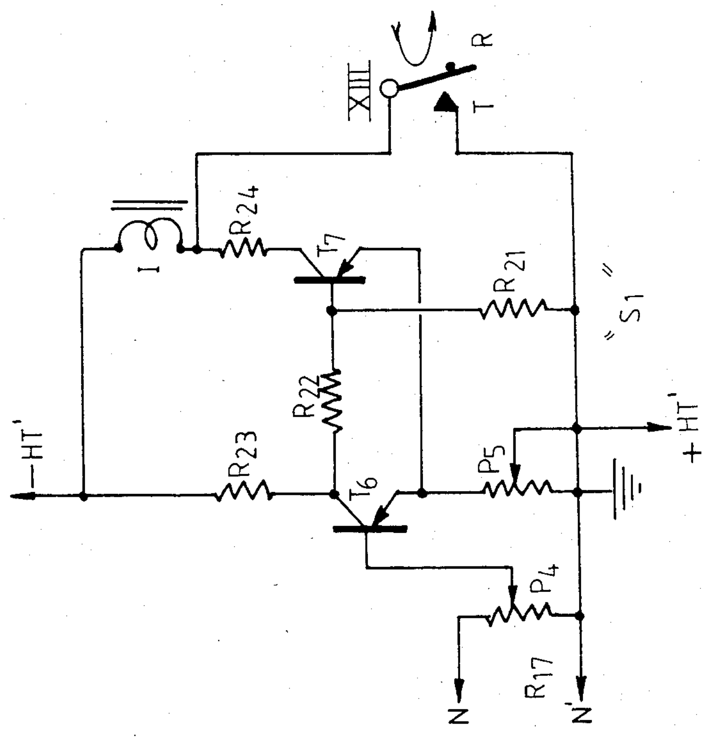
FIG. 5 is a simplified schematic diagram of a second safety circuit for use with the invention as applied to the field of electrotherapy.

The safety sub-unit S1 (FIG. 5, comprises a Schmitt trigger, with two stages of stability controlled by the contactor XIII, resistor R17 and potentiometers P4 and P5 for adjusting the changeover threshold. In the operative position of the trigger (transistor T6 cut off, transistor T7 conductive), which is actuated by the contactor XIII, the current of transistor T7 supplies relay I which thus remains in the operative position (T). The trigger has a second control comprising resistor R17 and potentiometer P4 carrying the main current i of the system (FIG. 2). If current i exceeds the normal operating limit, the resulting excess negative voltage at the terminals of R17 and P4 causes the trigger to change over resulting in cut-off of transistor T7 and immediate break of the current flowing through relay I, which thus returns to its inoperative position (R).

The normal sequence of operation of the control of safety units thus takes place as follows: Pressure applied to contactor XIII actuates relay I which goes to the operative position. This effect is obtained by temporarily applying to relay I (via contactor XIII) the whole of the voltage −HT (FIG. 5, sheet 4/4), the relay I then being held in the operative position by the current permanently flowing through transistor T7, limiting resistor R24 and the coil of said relay I; the contact 1/T−I of relay I then brings the contact 1.T/II of relay II to voltage −12 volts via the holding resistor r1; on the application of voltage to the whole system, relays V and II are at that time in the operative position since the winding V is then fed with current through closed contactor VI and coil II is fed with current via the then closed circuit comprising −12 V, contactor VII−R, contact 4/T−V of relay V, contact 1/T−II of relay II, winding II, contactor XII−R, +12 V; contact 1/II of relay II then are at that time in position 1/T−II and the circuit was also closed along the following path: −12 V, contact 1/T−I of relay I, holding resistor r1, contact 1/T−II, winding II, contactor XII−R, +12 V). When contactor X (manual pressure) passes to the temporary operative position (T) it closes the circuit comprising +12 V, contactor X−T, contact 1/T−V of relay V, winding of relay III, contact 2/T−II of relay II, −12 V, and current flowing through the winding of relay III brings relay III to the operative position T; the high voltage +HT is then applied via contact 1/T−III of relay III to the point +HT of FIG. 2 on sheet 2/4 while contact 2/T−III of relay III closes the circuit: +12 V, contactor XI−R, holding resistor r2, contact 2/T−III of relay III, winding III, contact 2/T−II of relay II, −12 V, and ensures that the relay III is held in the operative position T when the pressure on the contactor X is released. Operation of the time switch M which is intended to fix the duration of passage of the current i simultaneously causes the contactors VII, VIII and IX to move into the operative position T: the open contactor VII breaks the direct energization circuit of relay II which nevertheless remains in the operative position T because its winding receives current via the holding resistor r1; closed contactor VIII causes the time switch pilot light V8 to illuminate. Contactor IX closes the circuit comprising +12 V, contact IX−T, contact 2/T−V of the relay V, winding IV of the relay IV; contact 2/T−II of relay II, −12 V, and supplies the said winding IV with current causing relay IV to move into the operative position T while contact 2/T−IV closes the circuit: +12 V, contactor IX−T, contact 2/T−IV of relay IV, holding resistor r3, winding IV, contact 2/T−II of relay II, −12 V, and contact 1/T−IV of said relay IV closes the circuit for suppressing the negative bias (Pol.) which in the inoperative state ensures over-cut-off of the base of transistor T1 (FIG. 2).

The said bias suppression circuit illustrated in FIG. 4 comprises a series resistor bridge (R1,P1,R2,R18,R19) supplied with voltage between −U6 and +U7; a high capacitance capacitor C3 and the "operative" terminal T−IV and the movable contact 1/IV of relay IV are connected at the terminals C and D of resistor R18. In the inoperative position of relay IV, the circuit Pol. C-Pol. D is opened by said relay IV and capacitor C3 is charged to the maximum voltage (UC−UD) maintained by the current flowing through R18 and the combination of resistors in series: The choice of the values of the said resistors enables the potentials UE and UF of the ends of the potentiometer P1 controlling the transistor T1 to be kept at a highly negative value of ensure cut off of said transistor T1 and nullity of the main current i irrespective of the position of P1. When relay IV comes into the operative position ("bias suppression") it closes contact 1/T−IV and thus very rapidly discharges capacitor C3 through the limiting resistor R20: voltage (UC−UD) is cancelled and potential UE rises to a positive value while potential UF rises to a slightly negative value to limit the cut off of transistor T1 when the slider of P1 is at the start of its travel (point F). Operation of potentiometer P1 progressively increases the potential of the base of T1, the main current i of which increases up to the maximum value fixed for the system. When relay IV returns to the inoperative position, contact 1/IV of said relay opens: capacitor C3 re-charges through circuit: R19, R2, P1, R1 in a time which depends only on the values of the said components; potentials $U_D$, $U_E$ and $U_F$ then diminish to the same law resulting in progessive reduction of the main current i of transistor T1 by reducing the potential of its base. When C3 is completely recharged transistor T1 is cut off again and the current i is zero irrespective of the position of the slider of P1 at that time.

Contactor VI is triggered by the beginning of the travel of the potentiometer P1 controlling the main current i: Said contactor VI passes into the operative position T at the time when the travel of the slider of the potentiometer P1 starts, said current i having at that time zero value. The contactor VI passing into the operative position opens the circuit: +12 V, contactor VI−T, winding V of relay V, −12 V, and causes relay V to move into the inoperative position R. The open contact 4/R−V of relay V results in the second break (the first is provided by the contactor VII in the operative position) of the control of relay II which nevertheless remains in the operative position since its winding (II) receives current via the holding resistor r1 and the contact 1/T−I of relay I. The open contact 2/R−V of relay V breaks the control circuit of relay IV which also remains in the operative position since its winding is supplied via the holding resistor r3. The open contact 1/R−V of relay V provides the additional breaking (the first break is provided by contactor X in the inoperative position) of the control circuit for relay III.

The combination of active safety circuits in the operative position then allows progressive increasing regulation of the main current i by means of potentiometer P1. When the duration chosen by time switch M has elapsed, the said time switch returns the three contactors VII, VIII and IX into the inoperative position. The closing of contactor VII/R does not change the state of relay II since the contact 4/R−V of relay V is open. Opening of contactor VIII/R extinguishes the pilot light V8. The opening of contactor IX/R breaks the holding current circuit of relay IV which returns to the inoperative position: contact 1/IV of relay IV opens and thus breaks the suppression circuit for the negative bias Pol., resulting in the slow decreases of the main current i and its cancellation. It is then possible—and necessary—to return the slider of potentiometer P1 to the start of its travel and thus close the contactor VI which comes to the inoperative position, supplies current to the winding of relay V which then returns to the operative position. If as a result of an oversight or accident the contactor VI remains in the operative position T, relay V then remains in the inoperative position and resetting of the time switch cannot in any case energize the winding of relay IV, the supply circuit of which remains broken by contact 2/R—V of relay V in the inoperative position.

Thus after the time switch has stopped the patient cannot suddenly receive voltage by accidental operation of the said time switch if the slider of potentiometer P1 controlling the current i has not been returned to the start of its travel as a result of an oversight.

When the two operations have been correctly carried out the system is ready for re-starting.

In the event of accidental breaking of the mains supply during operation, the five relays return to the inoperative position and the main current i is rapidly returned to zero. If the mains voltage returns before the responsible operator has been able to reset the time switch to stop and the slider of the potentiometer P1 to the start of its travel, relay V retains its inoperative position R: contacts 1/V, 2/V and 4/V are then open and thus prevent energization of relays II, III and IV and their return to the operative position. In addition, contactor VII of the time switch in the operative position, i.e. open, doubles the prevention of resetting of relay II. Relay I also remains in the inoperative position despite the change-over of the trigger which makes the transistor T7 conductive (FIG. 5, sheet 4/4) when the mains voltage returns. The reason for this is that resistor R24 limits the current flowing in the winding I to a value below that required for the changeover of the relay I. The return to normal operation therefore requires all the contactors to be returned to their inoperative position and thus the relay V to assume the required operative position. Thus the structure obtained prevents actuation of one of the three relays II, III or IV before the relay preceding it has been actuated beforehand. This actuation of the relays II, III and IV therefore requires two simultaneous conditions to be satisfied: The slider of potentiometer P1 must be returned to the start of its travel, resulting in relay V moving to the operative position and relay I must move into the operative position in response to the contactor XIII.

Any instant likely to increase the main current i beyond a predetermined limit value results, due to the excessive negative voltage at the terminals of R17 and of the potentiometer P4 (FIGS. 2 and 5) in the trigger changing over, thus making the transistor T6 conductive and cutting off transistor T7, resulting in abrupt suppression of the current supplying the winding of relay I which immediately returns to the inoperative position. The contact 1/I of relay I opens and breaks the supply to the holding circuit of relay II which returns to the inoperative position so that the contact 2/II of said relay II opens and breaks the supply of the holding circuits for relays III and IV which return to the inoperative position. Contacts 1/III of relay III and 1/IV of relay IV simultaneously break the high-tension and bias suppression circuits, thus ensuring the very fast return of the main current i to zero. In this case also, the main current i cannot be restored until all the controls have returned to the initial inoperative position and relay V has returned to the operative position.

If an incident outside the system occurs during its use, requiring immediate breaking of the main current i, a brief pressure applied to either of the contactors XI or XII ensures that relay III returns to the inoperative position and that the high-tension HT is broken, or that relay II returns to the inoperative position and the supply to the relays III and IV is broken, these relays then returning to the inoperative position and thus simultaneously breaking the high tension HT and suppressing the bias Pol.

Finally, any accidental return of one of the relays I–IV to the inoperative position results in immediate suppression of the main current i as a result of the breaking of the supply current to the windings of said relays and the breaking of the high-tension circuit HT or breaking of the bias suppression circuit while if the relay V is held in or accidentally returned to the inoperative position it prevents any re-actuation of the relays in front of it and thus prevents any return of the main current i when the potentiometer P1 occupies any slider position other than the end of travel position (at which i is zero).

I claim:

1. A regulated-current, controlled-voltage generator comprising (a) a d.c. voltage source for applying a voltage across a load to cause a current to flow in the load;

(b) a control circuit for determining the value and form of the current flowing in the load according to predetermined criteria;

(c) a current regulating circuit in series with the voltage source and the load for regulating the current flowing in the load, the current regulating circuit including a four-pole injector for regulating the value and form of the current flowing in the load in response to the control circuit, and a first voltage regulating loop for generating a fixed voltage which forms the input to the injector; and (d) a voltage control circuit in series with the load, the current regulating circuit and the voltage source for supplying a constant voltage to the current regulating circuit independent of the load and the current flowing in the load.

2. Apparatus according to claim 1, the voltage control circuit further comprising circuit means for maintaining constant the sum of the voltage across the load and the voltage across the voltage control circuit.

3. Apparatus according to claim 2, wherein said circuit means comprises an impedance which varies according to variations in the load.

4. Apparatus according to claim 2, wherein said circuit means comprises an impedance which varies according to variations in the current flowing in the load.

5. Apparatus according to claim 2, wherein said circuit means comprises an impedance which varies according to variations in both the load and the current flowing in the load.

6. Apparatus according to claim 1, wherein the load comprises a portion of a patient's body.

7. Apparatus according to claim 1, further comprising circuit means actuated by timer means to automatically interrupt the current flowing in the load after a preselected time.

8. Apparatus according to claim 7, wherein said circuit means is adapted to progressively suppress the current in the load to zero after said preselected time.

9. Apparatus according to claim 5, wherein said progressive suppression is exponential and has a time constant of approximately fifteen seconds.

* * * * *